May 22, 1934.  M. CORNELL  1,959,904
FLUID METER
Filed Aug. 22, 1931  2 Sheets-Sheet 1
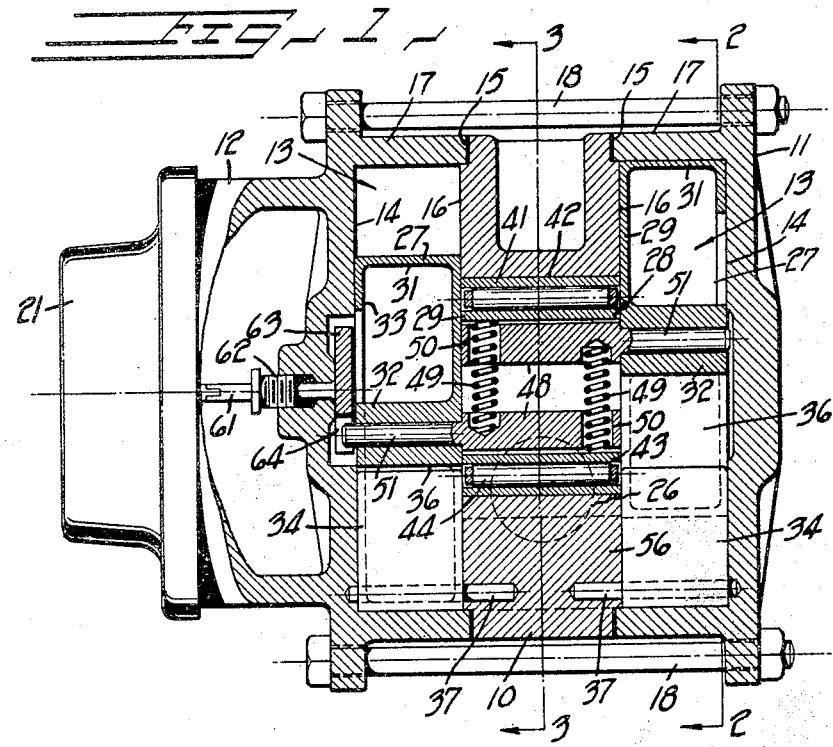
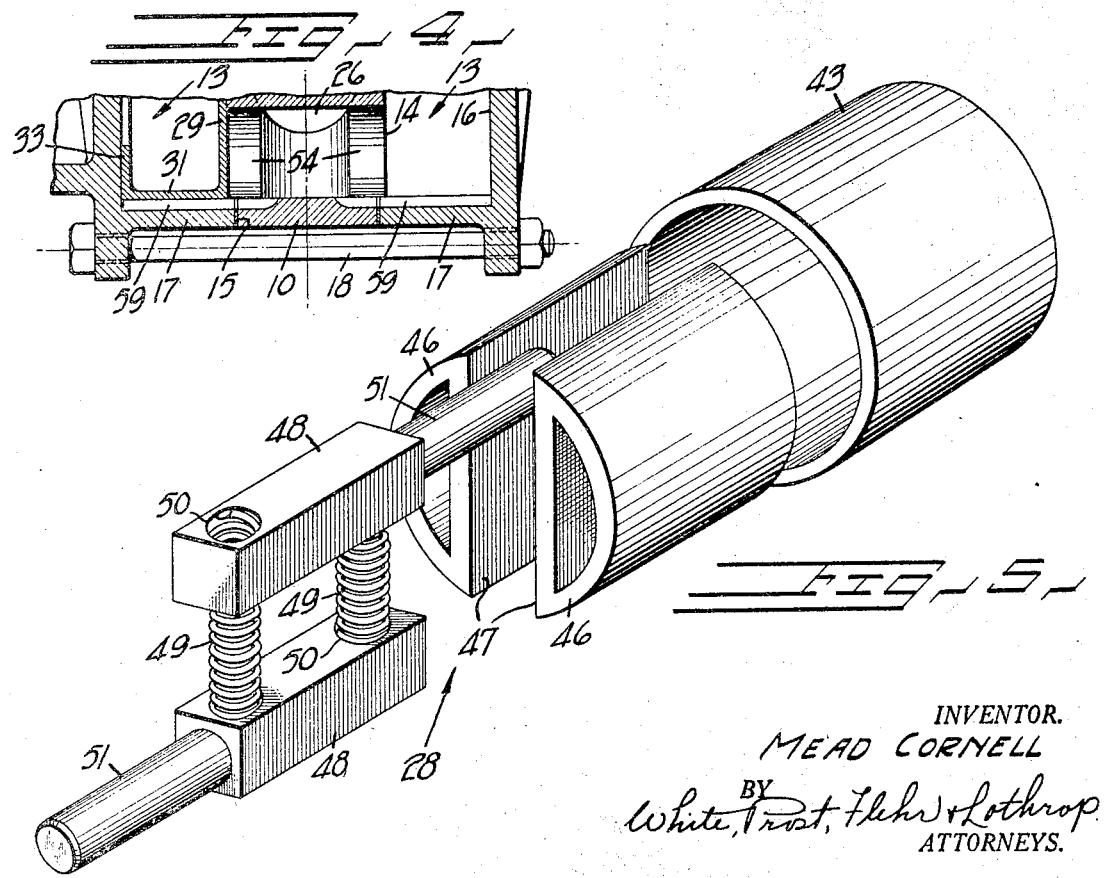
INVENTOR.
MEAD CORNELL
BY White, Prost, Flehr & Lothrop
ATTORNEYS.

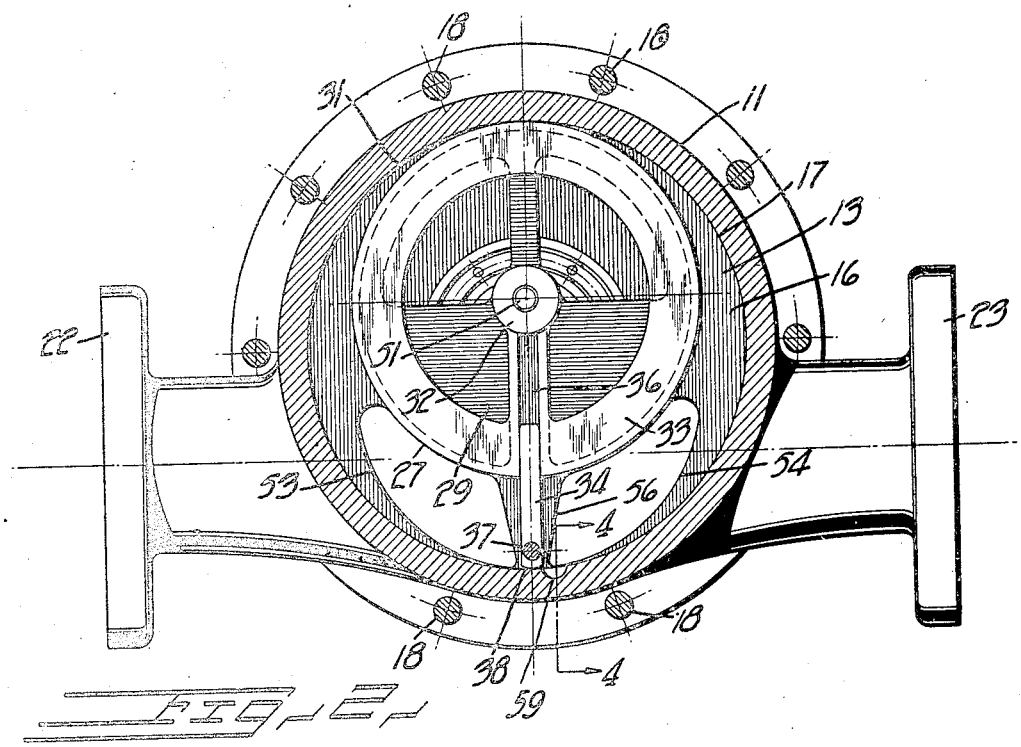
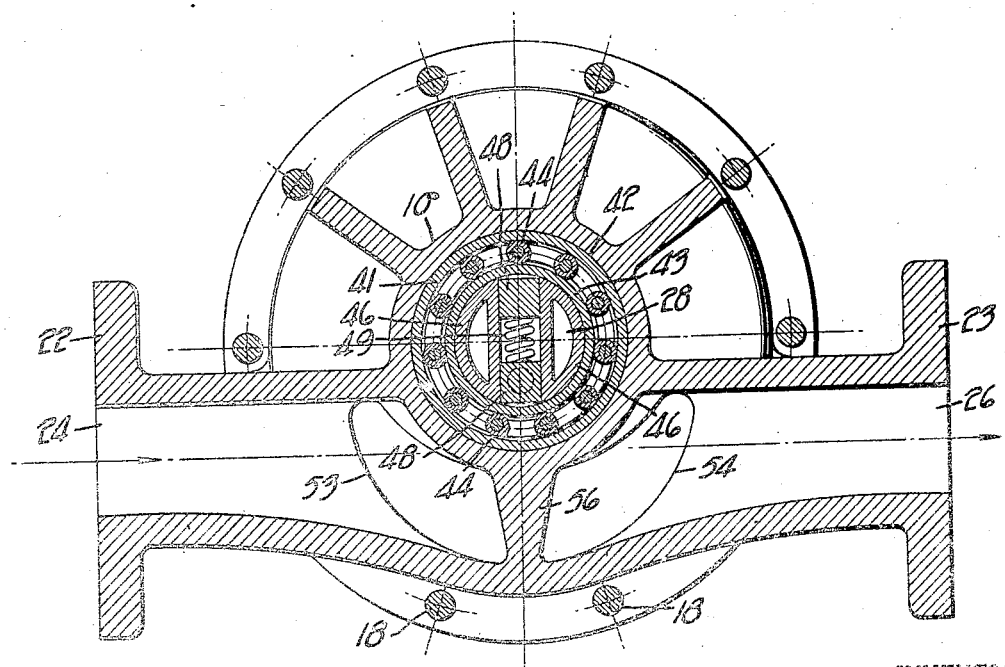

Patented May 22, 1934

1,959,904

UNITED STATES PATENT OFFICE 1,959,904

FLUID METER

Mead Cornell, San Francisco, Calif., assignor to
The Merrill Company, San Francisco, Calif.,
a corporation of California Application August 22, 1931, Serial No. 558,651

5 Claims. (Cl. 73—37)

This invention relates generally to meters for measuring flow of various liquids.

It is a general object of the invention to improve upon fluid meters of the type disclosed in my Reissue Patent 18,067, granted May 12, 1931.

It is a further object of the invention to devise a fluid meter having movable mechanical parts, and which is capable of operating over a wide range of fluid flow rates. In this connection the invention is characterized by the fact that certain moving parts within the meter are balanced with respect to each other so that these parts can operate at high speed without causing undue head loss and mechanical vibration.

It is a further object of the invention to devise an improved form of duplex piston type meter, in which the pistons will readily pass obstructions imposed between the pistons and the peripheral walls of the piston chambers.

It is a further object of the invention to devise a fluid meter having structural elements which can be readily assembled and manufactured, and which will have an arrangement of ports affording a minimum of flow resistance and head loss.

Further objects of the invention will appear from the following description in which the preferred embodiment of the invention has been set forth in detail in conjunction with the accompanying drawings. It is to be understood that appended claims are to be accorded a range of equivalents consistent with the state of the prior art.

Referring to the drawings:

Figure 1 is a side elevational view, in cross section, illustrating a meter incorporating the present invention.

Fig. 2 is a cross sectional detail taken along the line 2—2 of Fig. 1.

Fig. 3 is a cross sectional detail taken along the line 3—3 of Fig. 1.

Fig. 4 is a cross sectional detail, taken along the line 4—4 of Fig. 2.

Fig. 5 is a detail view, in perspective, showing the construction and assembly of the journal means utilized in my meter.

The meter as illustrated in Fig. 1 consists of a casing formed of an intermediate section 10, and side sections 11 and 12. When the meter is in upright position, section 11 becomes the lower section of the casing, while section 12 is uppermost. Both casing sections 11 and 12 are formed to provide piston chambers 13, which are shown as being identical and aligned on a common axis. Each chamber 13 is defined by machined parallel flat walls 14 and 16, and a cylindrical wall 17. Gaskets 15 can be interposed between the adjacent sections to afford a fluid tight seal and the sections are shown tightly clamped together by stay bolts 18. A housing 21 formed upon the outer side of casing section 12, serves as an enclosure and mounting for indicating mechanism.

As shown more clearly in Figs. 2 and 3, flanged portions 22 and 23 extend from opposite sides of the intermediate casing section 11, and these portions are cored to form inlet and outlet passages 24 and 26. Fitted within chambers 13, are the displacement pistons 27. These pistons are cylindrical, but are of a diameter substantialy less than that of piston chambers 13. They are constrained to take a gyrating movement within chambers 13, by journal means indicated generally at 28.

A suitable construction for pistons 27 will be apparent from an examination of Figs. 1 and 2. Each piston is skeletonized or hollow for lightness, and includes an end wall 29, peripheral wall 31, and central hub 32. The end of each piston opposite from wall 29 is defined by a web 33.

In accordance with the invention disclosed and claimed in my Reissue Patent 18,067, each piston is also cooperatively associated with a bridge plate 34. Each bridge plate 34 extends between the parallel walls 14 and 16 of its associated piston chamber, and is slidingly received within a slot 36 extending radially in the associated piston. The outer end of each bridge plate is pivotally connected to the casing by means of pivot pin 37. As a suitable connection between this pivot pin and the casing, one end of each pin is shown extending into the intermediate casing section 10, while the other end extends into a corresponding side casing section. It will be noted from Fig. 2 that pivot pin 37 is preferably spaced inwardly a short distance from the outer end of the bridge plate. The outer end of each bridge plate has a curved surface as indicated at 38 in Fig. 2, and has relatively slight clearance with respect to the adjacent portion of the cylindrical wall surface 17.

Journal or eccentric means 28 serves to cooperatively connect the casing to the pistons 27, whereby these pistons are constrained to gyrate within their respective piston chambers, and is characterized by the use of resilient elements. The form of journal means illustrated can be made clear by reference to Figs. 1, 3 and 5. It consists of a metal bushing 41 having a pressed fit within a bore 42 formed in the intermediate casing section 10. This bore is concentric with respect to the common axis of the two piston chambers 13. Within bushing 42 there is a sleeve 43 of relatively smaller diameter, and interposed between this sleeve and bushing 42, are the rollers 44. Thus sleeve 43 is free to rotate with a minimum of friction. Referring to Fig. 5, adapted to be fitted within sleeve 43, are two segmental members 46. Movably disposed between the spaced opposed faces 47 of segmental members 46, are the blocks 48. Blocks 48 are normally urged apart by the coiled compression springs 49. One end portion of each spring passes thru an aperture 50 in one block and normally seats upon the inner periphery of sleeve 43, while the other end of the spring is seated in the other block 48. Journal pins 51 extend from the opposite ends of blocks 48.

Normally the axes of pins 51 are in a plane common with the common axis of the piston chambers 13, and the eccentricity of each pin is substantially the same. As shown in Fig. 1, pins 51 extend thru pistons 27 and serve as journals for the piston hubs 32.

In order to provide inflow of fluid into the piston chambers, and exhaust of fluid therefrom, the intermediate casing section 10 is provided with two duplicate sets of inflow and outflow ports, one set being for each piston chamber. Thus referring to Fig. 3, one set of ports include an inflow port 53 which is in communication with passageway 24, and an exhaust port 54 which is in communication with outflow passage 26. The obstruction or web 56 segregates ports 53 and 54 of each set, and also segregates inflow and outflow passages 24 and 26. As is shown in Fig. 2, these ports 53 and 54 communicate thru a side wall 16 of the corresponding piston chamber, upon opposite sides of the corresponding bridge plate 34.

When each piston passes thru a position 180° displaced from the position shown in Fig. 2, a small amount of fluid may be trapped adjacent one side of the bridge plate. If flow of liquid is being measured, hydraulic hammer with resulting vibration to the moving parts may result. I prevent such effect by providing a small recess 59 in the casing adjacent that side of each bridge plate which corresponds with the location of an exhaust port 54. Recesses 59 communicate with ports 54 and thus insure unobstructed exhaust of fluid.

As will be presently explained, upon flow of fluid thru the meter casing, journal means 28 is caused to rotate, and the pistons gyrate within their respective chambers. In order to transmit this motion to suitable indicating means, a rotatable shaft 61 is shown extending into housing 21, thru a suitable packing gland 62. A disc 63 is secured to the inner end of shaft 61, and the peripheral portion of this disc is provided with a slot 64. The end portion of an adjacent journal pin 51 extends into slot 64, so that disc 63, and thus shaft 61, are caused to rotate together with rotation of the cooperating pin 51. The indicating means contained in housing 21 can be of any suitable type well known in the art, and usually incorporates reduction gearing connected to shaft 61.

To explain the mode of operation of my meter, it will be presumed that a source of fluid under a substantial head is connected with inflow passage 24, and that the fluid is permitted to flow out thru the outflow passage 26. Assuming also that one piston is momentarily in a position indicated in Fig. 2, fluid will flow from inflow passage 24 into the two piston chambers 13 thru the inflow ports 53. The pressure flowing into the spaces upon the left hand sides of the bridge plates 34 as viewed in Fig. 2, causes a displacement of the pistons, the displacement being in a clockwise direction. Movement of the one piston shown in Fig. 2 serves to reduce the volumetric capacity of the space upon the right hand side of the associated bridge plate, so that fluid contained therein is exhausted thru the associated exhaust port 54 to the outlet passage 26. As the piston illustrated in Fig. 2 moves from the position shown therein to the position 180° removed therefrom, both of the corresponding ports 53 and 54 are cut off by the piston end wall 29, and the fluid which has flowed in thru port 53 is trapped within the chamber. Upon completion of its movement back to the position shown in Fig. 2, fluid again flows in thru port 53 to urge the piston in its travel, while the trapped fluid is expelled thru port 54.

Because of the use of duplex pistons, and because these pistons are retained by journal pins 51 which are 180° apart, each piston is carried over its dead center position by fluid force exerted upon the other. Maintenance of the pistons 180° apart also serves to balance one piston with respect to the other. Such a balance is a desirable feature of my invention as it makes possible a high speed of movement of the parts without causing undue mechanical vibration, and without causing undue head losses. Thus a meter constructed in accordance with my invention is capable of measuring fluids over a wide range of flow rates.

The resilient elements utilized in journal means 28 makes it possible for each piston to pass an obstruction which may oppose itself between the periphery of the piston and the adjacent peripheral walls of the piston chambers. For example presume that a small solid object should flow into the meter with the liquid or gas being measured, and that this foreign object should become wedged between the periphery of one of the pistons and the adjacent peripheral wall 17 of the piston chambers. The journal pin 51 connected to that piston would give a certain amount toward the axis of the piston chamber, so that the piston would pass over the obstruction. In this connection note that the parts of my meter are so constructed, that there is normally slight clearance between the periphery of each piston, and the peripheral portion 17 of each piston chamber. This clearance is insufficient to cause substantial leakage by bypass of fluid thru this clearance, but does enable the pistons to gyrate with a minimum of friction.

The resiliency afforded for the pistons which has been described above also enables my meter to automatically compensate for changes in viscosity, such as are occasioned by changes in temperature of liquids such as lubricating greases. If no give were afforded to the pistons, in metering highly viscous liquids there would be great head loss with a consequent inaccuracy in the metering. However with my meter the resiliency of spring 49 can be such that with highly viscous liquid the clearance between the periphery of each piston and the peripheral wall 17 of the piston chamber is automatically increased, thus permitting the pistons to travel more freely.

As has been previously explained, cavities prevent trapping of fluid when each piston is passing thru a position at 180° to the piston shown in Fig. 2. This is a desirable feature when operating the pistons at a high speed in the measuring of liquids, as liquid hammer with resulting deleterious mechanical vibration to the parts is minimized.

I claim:

1. In a fluid meter, a casing formed to provide two substantially cylindrical chambers alined upon a common axis, said casing having fluid inlet and outlet passages, substantially cylindrical pistons disposed within said chambers, each piston being of a diameter substantially less than its associated chamber whereby a gyrating movement of each piston is permitted, bridge plates disposed within said chambers, each bridge plate extending from one side wall portion of its associated chamber and having a connection with the piston with such chamber, and bearing means cooperating between the casing and said pistons whereby each piston is constrained to gyrate within its particular chamber, said bearing means comprising a member rotatably journaled within the casing between the chambers, a pair of journal pins connected axially with the pistons, and means for causing said pins to be carried by said journaled member, said last means including resilient elements whereby each pin can be independently moved toward said common axis of the chambers against the urge of at least one of said resilient elements.

2. In a fluid meter, a casing formed of intermediate and outer sections, the outer sections being adapted to fit upon opposite sides of the intermediate section, each of said outer sections being formed to provide in conjunction with said intermediate section a substantially cylindrical piston chamber, means for clamping said sections together, pistons disposed within said chambers, said pistons being substantially cylindrical and of a diameter substantially less than the diameter of said chambers, bearing means cooperating between said casing and the pistons, bridge plates disposed within the chambers and connected with the pistons, said intermediate casing section being formed to afford inflow and exhaust passages and ports communicating with both chambers.

3. In a fluid meter, a casing formed of intermediate and outer sections, the outer sections being adapted to fit upon opposite sides of the intermediate section, and being also formed to afford in conjunction with said inner section two substantially cylindrical piston chambers alined upon a common axis, means for clamping said casing sections together, substantially cylindrical pistons disposed within said chambers and having slots extending from their peripheries, each of said pistons being of a diameter substantially less than its associated chamber whereby a gyrating movement of the pistons is permitted, journal means cooperating between the intermediate section of the casing and both said pistons, whereby each piston is constrained to gyrate within its particular chamber, bridge plates disposed within said chambers, one end of each bridge plate being pivotally connected to the casing adjacent one side wall portion of the corresponding chamber and having its other end portion disposed within one of said slots afforded in the corresponding piston, said intermediate casing section being formed to afford two sets of fluid inflow and exhaust passages and ports, each set of ports communicating thru an inner side wall of a piston chamber upon opposite sides of a corresponding bridge plate.

4. In a fluid meter, a casing having inflow and outflow passages and formed to provide a cylindrical piston chamber having parallel flat end walls, a substantially cylindrical piston disposed within said chamber and having a diameter substantially less than the diameter of the chamber, journal means cooperating between the casing and the piston whereby the piston is constrained to gyrate within the chamber, and a bridge plate cooperating between the casing and the piston, said bridge plate extending between the end walls of the chamber, said casing being provided with inflow and exhaust passages and ports communicating thru one of said end walls upon opposite sides of said bridge plate whereby said ports are successively closed and opened upon gyration of said piston, the peripheral wall of said chamber adjacent one side of said bridge plate being provided with a vent recess communicating with said exhaust port.

5. In a fluid meter, a casing having inflow and outflow passages and formed to provide a piston chamber having opposed parallel flat end walls and a peripheral cylindrical wall, a substantially cylindrical piston disposed within said chamber and having a slot extending from its periphery, said piston having a diameter substantially less than that of the piston chamber, journal means cooperating between the casing and the piston whereby the piston is constrained to gyrate within the chamber, a bridge plate disposed within the chamber and slidingly fitted within said slot formed in the piston, and means for pivotally connecting the outer end portion of said bridge plate to the casing, said bridge plate extending between the end walls of the chamber, said casing being provided with inflow and exhaust ports communicating thru one of said chamber end walls upon opposite sides of said bridge plate and also communicating with said inflow and outflow passages respectively, the peripheral wall of said chamber adjacent the side of said bridge plate having the exhaust port being provided with a vent recess communicating with said exhaust port.

MEAD CORNELL.